United States Patent
Botto et al.

(10) Patent No.: US 12,504,049 B2
(45) Date of Patent: Dec. 23, 2025

(54) VIBRATION DAMPER IN A HYDRAULIC FRICTION CLUTCH ACTUATION SYSTEM OF A MOTOR VEHICLE

(71) Applicant: RAICAM DRIVELINE S.R.L., Mondovi' (IT)

(72) Inventors: Francesca Botto, Mondovi' (IT); Jean-Baptiste Bedrignans, Bra (IT); Mattia Rossi, Vicoforte (IT)

(73) Assignee: Raicam Driveline S.R.L., Mondovi (IT)

( * ) Notice: Subject to any disclaimer, the term of this patent is extended or adjusted under 35 U.S.C. 154(b) by 0 days.

(21) Appl. No.: 18/719,486

(22) PCT Filed: Dec. 15, 2022

(86) PCT No.: PCT/IB2022/062272
§ 371 (c)(1),
(2) Date: Jun. 13, 2024

(87) PCT Pub. No.: WO2023/111925
PCT Pub. Date: Jun. 22, 2023

(65) Prior Publication Data
US 2025/0043834 A1 Feb. 6, 2025

(30) Foreign Application Priority Data

Dec. 16, 2021 (IT) .................. 102021000031562

(51) Int. Cl.
*F16D 48/02* (2006.01)
(52) U.S. Cl.
CPC ............. *F16D 48/02* (2013.01); *F16D 25/14* (2013.01); *F16D 2048/0215* (2013.01); *F16D 2300/22* (2013.01)

(58) Field of Classification Search
CPC .................................................... F16D 25/088
See application file for complete search history.

(56) References Cited

U.S. PATENT DOCUMENTS

| | | | | |
|---|---|---|---|---|
| 3,424,196 A | * | 1/1969 | Donner ................ | G05D 7/0133 137/504 |
| 4,428,396 A | * | 1/1984 | Wall ........................ | F16K 47/10 137/493 |

(Continued)

FOREIGN PATENT DOCUMENTS

CN 1103935 A 6/1995

OTHER PUBLICATIONS

International Search Report for International Patent Application No. PCT/IB2022/062272, mailed Mar. 6, 2023.

*Primary Examiner* — Stacey A Fluhart
(74) *Attorney, Agent, or Firm* — Armstrong Teasdale LLP

(57) ABSTRACT

A pressure wave damper in a hydraulic system for actuating a friction clutch of a motor vehicle, which defines a sinuous path for a fluid of the hydraulic system is provided. The pressure wave damper, along the sinuous path, has a hydraulic pressure chamber elastically expandable by the fluid. The hydraulic pressure chamber is partially delimited by a resilient wall that is presented by a resilient vessel inside the hydraulic pressure chamber. An elastically compressible air chamber is formed inside the resilient vessel. One or more air channels place the air chamber in communication with air vent openings.

11 Claims, 2 Drawing Sheets

(56) References Cited

U.S. PATENT DOCUMENTS

| | | | |
|---|---|---|---|
| 5,004,215 A | | 4/1991 | Aubry et al. |
| 5,383,489 A | * | 1/1995 | Golestan .............. G05D 7/0133 |
| | | | 137/504 |
| 6,102,361 A | * | 8/2000 | Riikonen .................. F16K 7/07 |
| | | | 251/5 |
| 9,605,718 B2 | | 3/2017 | Gebert et al. |
| 10,288,093 B2 | | 5/2019 | Marks et al. |
| 2011/0303315 A1 | * | 12/2011 | Gebert .................. F15B 21/008 |
| | | | 138/30 |
| 2017/0248173 A1 | | 8/2017 | Marks et al. |
| 2021/0062873 A1 | * | 3/2021 | Bedrignans ............. F16D 25/12 |

* cited by examiner

VIBRATION DAMPER IN A HYDRAULIC FRICTION CLUTCH ACTUATION SYSTEM OF A MOTOR VEHICLE

CROSS-REFERENCE TO RELATED APPLICATIONS

This application is a National Stage Application of International Patent Application No. PCT/IB2022/062272, having an International Filing Date of Dec. 15, 2022, claiming priority to Italian Patent Application No. 102021000031562, having a filing date of Dec. 16, 2021, each of which is hereby incorporated by reference in its entirety.

TECHNICAL FIELD

The present invention relates to a damper for the reduction of vibrations, typically medium frequency vibrations, in a pressurized duct of a hydraulic actuation system for disengaging a clutch. In particular, the damper is configured for being applied in a section of pressurized duct which is located between a master cylinder (or main cylinder) and a slave cylinder (or servo cylinder) in the clutch release system.

BACKGROUND ART

A conventional type of friction clutch actuation system in a motor vehicle is provided with a master cylinder associated with the clutch control pedal and a slave cylinder that activates the clutch disengagement. The slave and master cylinders are hydraulically connected to each other via a hydraulic pipe.

While driving, it may happen that the driver keeps his foot on the clutch release pedal even when the pedal is not pressed. In such cases, in the absence of a filtering device, the driver may experience an unpleasant feeling in the foot, due to pulses or closely repeated pressure pulsations that are transmitted as vibrations to the clutch pedal through the liquid in the pressurized duct. These vibrations originate from the engine, which transmits them to the flywheel of the clutch. Upon reaching the pedal, these pressure pulsations can be felt by the driver when the foot rests on the pedal or when the pedal is kept pressed, for example during a stop at a traffic light.

The function of the filtering devices is to dampen the axial vibrations which, in the pressurized fluid, tend to rise up the duct and reach the clutch control pedal in the section between the pedal and the thrust bearing which acts on the diaphragm spring for disengaging the clutch.

A vibration damper described in U.S. Pat. No. 10,288,093 B2 provides an outer housing with a cylindrical cavity containing a sleeve membrane having a radially outer surface with ribs that are elastically compressible against the wall of the cavity.

SUMMARY OF THE INVENTION

An object of the present invention is to provide a pressure wave damper having a higher damping capacity. Another object is to provide a reliable damper, capable of maintaining its functionality over time.

The above and other objects and advantages, which will be better understood in the following description, are achieved, according to an aspect of the present invention, by a pressure wave damper as described and claimed herein. Preferred embodiments of the damper are also described.

In summary, a pressure wave damper in a hydraulic system for actuating a friction clutch for motor vehicles defines a sinuous path for the fluid and includes, along this path, a hydraulic pressure chamber elastically expandable by the fluid. The hydraulic pressure chamber is partly delimited by a resilient wall, which is presented by a resilient vessel, preferably in the form of a sleeve, contained within the hydraulic pressure chamber. The resilient vessel forms inside an elastically compressible air chamber and one or more channels that place the air chamber in communication with one or more air vent openings.

BRIEF DESCRIPTION OF THE DRAWINGS

A few preferred, but non-limiting embodiments of a damper according to the invention will now be described, referring to the attached drawings, in which.

DETAILED DESCRIPTION

Figure 1:
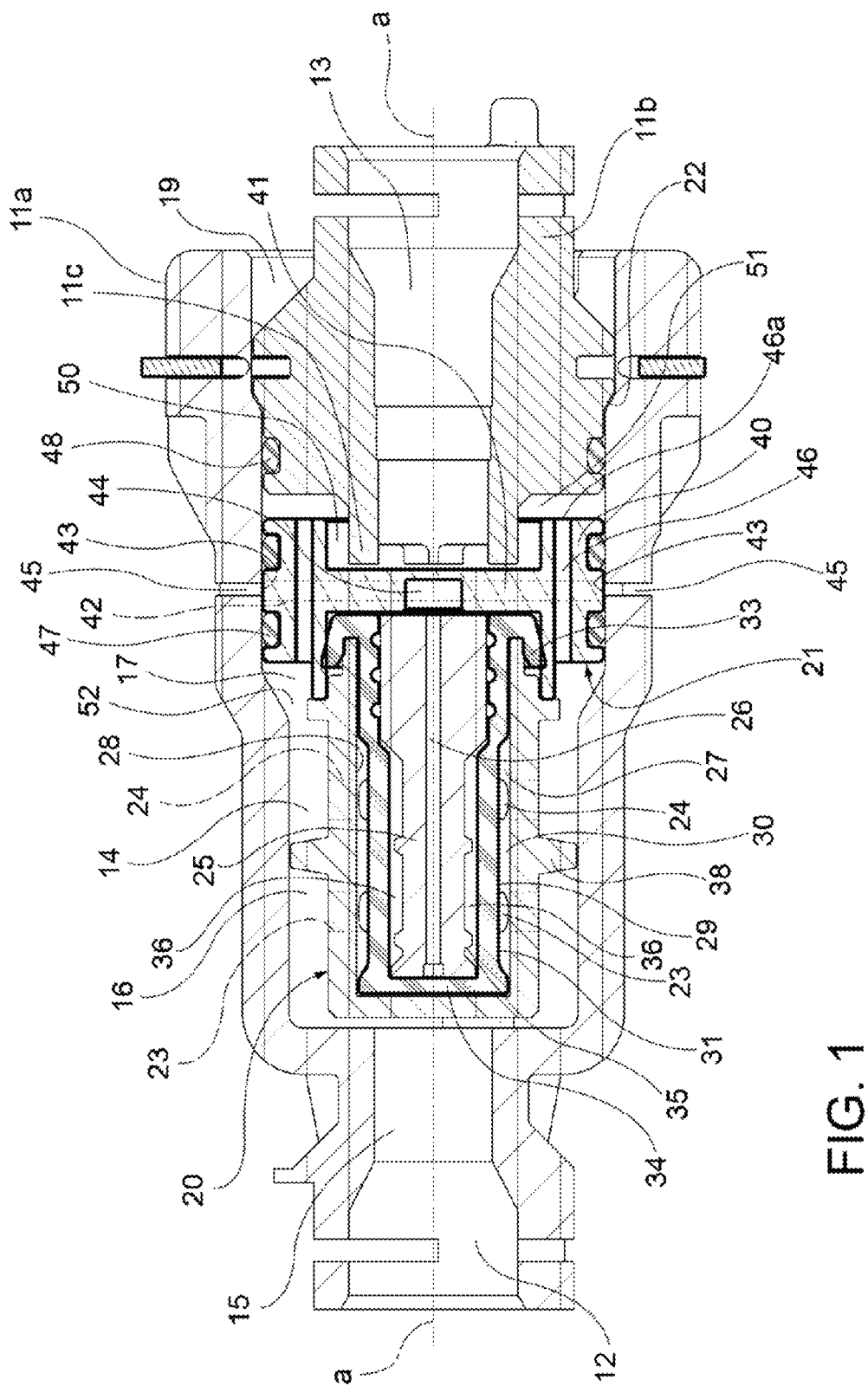
FIG. 1 is a schematic view in longitudinal section of a damper according to an embodiment of the invention.

With reference to FIG. 1, a vibration damper according to an embodiment of the present invention is indicated as a whole with reference number 10. The damper 10 is applied along a pressurized duct of a hydraulic actuation system for the disengagement of a clutch in a motor vehicle. The damper 10 comprises a hollow outer housing or body 11 which defines a longitudinal and central axis "a". The outer body 11 has an overall tubular shape elongated in a direction defined herein as "longitudinal", with reference to the axis a. As understood here, terms and expressions indicating directions and orientations such as "axial", "longitudinal, "radial" or "transversal", should be construed as referring to the longitudinal axis "a".

The outer body 11 has two opposite ends, with a first hydraulic connection 12 at a first end, fluidically connectable in use to a master cylinder (or main cylinder, not shown), and a second end with a second hydraulic connection 13 to be fluidically connected in use to a secondary cylinder (or "slave" cylinder, or servo cylinder, not shown). Typically, the master cylinder is associated with a clutch actuation pedal, while the slave cylinder acts on a diaphragm spring to disengage the clutch.

The outer body 11 has an internal through cavity 14 extending longitudinally between the two opposite hydraulic connections. In the internal cavity 14, between the first and the second hydraulic connection, a sinuous path is defined, which includes a series of deviations, which the pressure waves transmitted in the liquid of the hydraulic circuit are forced to take while flowing to and from each of the two opposite hydraulic connections 12, 13.

The internal cavity 14 may comprise consecutive sections of different diameters to stably retain inside it, at predetermined axial positions, a set of members adapted to determine the fluid path between the hydraulic connections.

In the example shown in FIG. 1, the internal cavity 14 comprises a first terminal section 15 adjacent to the first hydraulic connection 12, a second intermediate section 16 having a transversal size greater than that of the first terminal section 15 and adapted to house a first perforated distributor 20, a third intermediate section 17, having a transversal size still greater than that of the second intermediate section 16 and adapted to house a second perforated distributor element 21, and a fourth terminal section 18, adjacent to the second hydraulic connection 13 and having a diameter smaller than that of the third intermediate section 17 and comparable or corresponding to the diameter of the first terminal section 15.

In the particular embodiment illustrated, for assembly reasons, the outer body 11 of the vibration damper 10 is composed of the union of two complementary elements 11a and 11b. Of these, a first element 11a, axially longer, provides the first hydraulic connection 12 and the sections 15, 16 and 17 of the internal cavity 14. The first element 11a receives the second element 11b, which has the second hydraulic connection 13. The first element 11a forms a terminal section 19, with a larger diameter than that of the third intermediate section 17, thus determining an abutment 22 for the second element 11b.

Alternative embodiments (not shown) may provide that the outer body 11 of the vibration damper 10 is made as a single piece.

The first perforated distributor element 20 has a body of relatively rigid material, preferably of plastic material, essentially tubular in shape, which has an internal cavity 27 delimited by a cylindrical surface 28 and at least two axially spaced series of radial through openings or holes 23, 24.

Preferably, the first perforated distributor element 20 forms an outer spacer annular flange 38 which extends in a radially outer direction from an intermediate zone between the two series of radial through holes 23, 24 and contacts the wall of the second intermediate section 16 of the internal cavity 14.

Received within the internal cavity 27 of the first perforated distributor element 20 is a rigid and longitudinally elongated central tubular element 25, which has a longitudinally extending internal channel 26.

The central tubular element 25 is surrounded by a resilient vessel 31 having a resilient wall 29, in this example of tubular shape, elastically yielding in at least a transverse or radial direction. Preferably, the resilient vessel 31 is made of elastomeric material.

The resilient vessel 31 is received in the internal cavity 27 of the first perforated distributor element 20. In the illustrated embodiment, the resilient vessel 31 is shaped as an axially elongated cylindrical sleeve, and disposed within the cavity 14 substantially parallel or coaxial with respect to axis a.

A pressure chamber 30, communicating with the series of radial holes 23, 24, is defined between the wall 28 of the internal cavity 27 of the first perforated distributor element and the resilient wall 29 of the resilient vessel 31.

Figure 2:
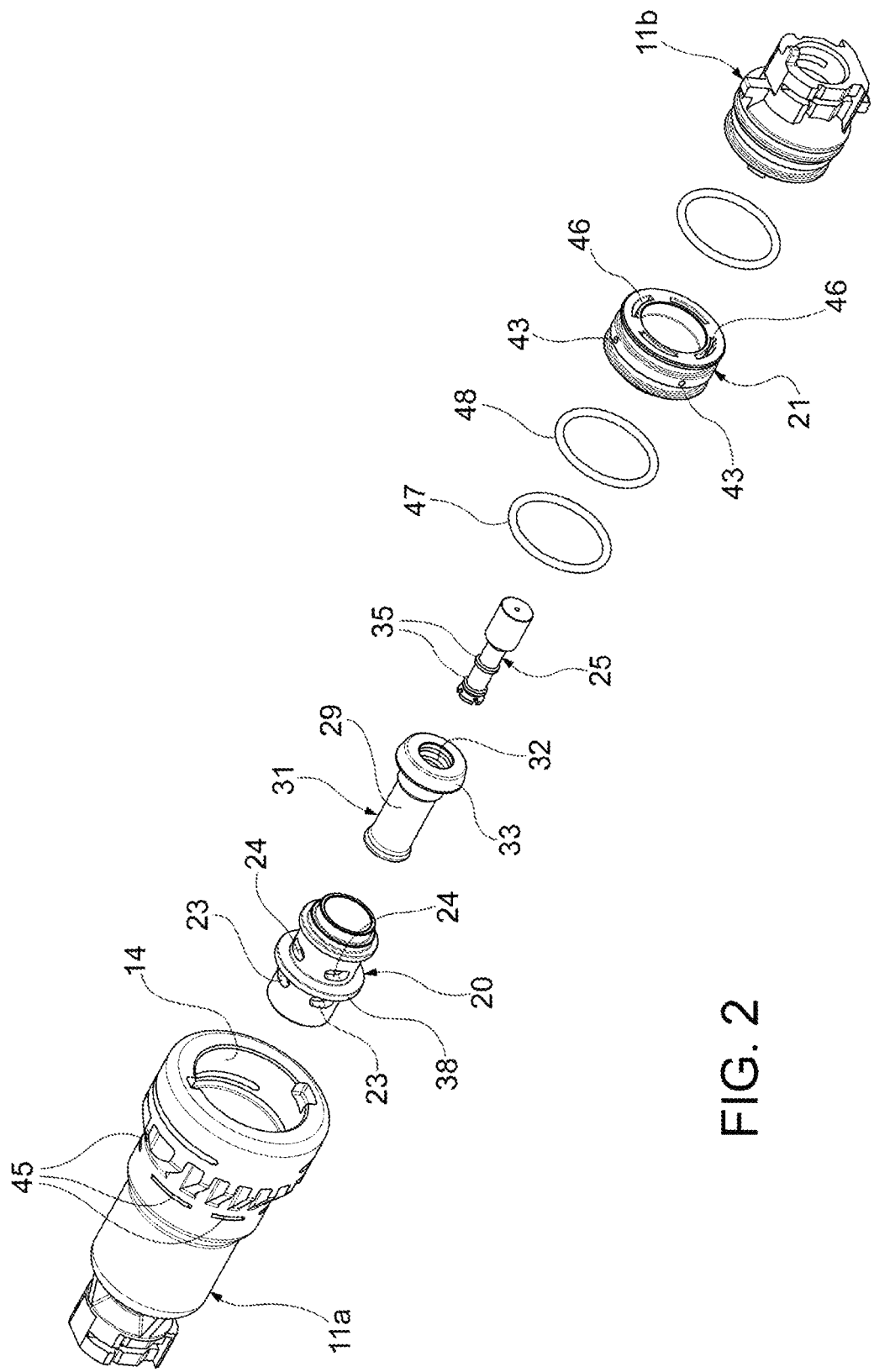
FIG. 2 is an exploded perspective view of the damper components of FIG. 1.

On the side facing the second hydraulic connection 13, the resilient vessel 31 provides an opening 32 (FIG. 2) with a hermetically sealed flange 33 between the first perforated distributor element 20 and the second perforated distributor element 21. On a side facing the first hydraulic connection 12, the resilient vessel 31 has a closed bottom 34, which gives it the overall shape of a cup, axially oriented with the opening 32 facing the second hydraulic connection 13.

As shown in the embodiment of FIG. 1, the central tubular element 25 may preferably have a series of projections 35, for example a series of annular ribs, spaced from each other and projecting in radially outward directions towards the resilient tubular wall 29 of the resilient vessel 31. The projections 35 cause that in a first step of the deformation by radial compression of the resilient tubular wall 29, this first deforms freely, opposing a determined intrinsic elastic force, but without coming into contact with the projections 35. At higher pressures, the resilient tubular wall 29 is progressively squeezed in radially internal directions, coming into contact with the projections 35, and, as a result of these, the wall 29 does not collapse completely on the central tubular element 25. Thanks to the projections 35, the resilient vessel 31 does not behave like a rigid body even under higher pressures, whereby the damper retains its ability to exhibit a damping effect even in the presence of high-pressure waves.

An air chamber 36 is defined between the central tubular element 25 and the resilient tubular wall 29.

The second perforated distributor element 21 has the general shape of a flanged ring, axially adjacent to and aligned with the first perforated distributor element 20.

In the illustrated example (FIG. 1), the second perforated distributor element 21 is received in the third intermediate section 17 of the cavity 14, and has a central disc-shaped portion 41 transversely oriented, and a radially outer peripheral portion 40, preferably axially elongated, and preferably sealingly coupled against the surface of the third intermediate section 17 of the cavity 14.

At least one radial air channel 42 is formed in the central disc-shaped portion 41. The air channel 42 establishes an air communication between a central opening 44 aligned and communicating with the central channel 26 of the central tubular element 25, and at least one peripheral opening 43 which communicates with at least one corresponding air vent through opening 45 obtained through the outer housing 11.

The second perforated distributor element 21 has at least one axial through hole 46, not communicating with the air channel 42. The axial hole 46 serves to allow the passage of liquid of the hydraulic circuit between the hydraulic connections 12, 13.

According to an embodiment, the second perforated distributor element 21 has a plurality of radial air channels 42, angularly spaced in a radial pattern and communicating with a corresponding plurality of air vent openings 45, for example in the form of arcuate slits circumferentially spaced through the housing 11.

Furthermore, according to a preferential embodiment, the second perforated distributor element 21 has a plurality of axial through holes 46 for the liquid of the hydraulic circuit, angularly spaced and not communicating with the radial air channels 42.

Two peripheral seals 47, 48, preferably in the form of O-ring seals, are provided axially spaced apart and acting between the peripheral portion 40 of the second perforated distributor element 21 and the surface of the third intermediate section 17 of the cavity 14. The radial channels 42 have their peripheral openings 43 in axially intermediate positions between the seals 47, 48.

In the particular embodiment of the damper illustrated in FIG. 1, inside the cavity 14 a Z-shaped passage 50 is formed between the second hydraulic connection 13 (clutch side), where the diameter is smaller, to the peripheral zone, of greater diameter, where the axial holes 46 through the second perforated distributor element 21 are located. The Z-shaped passage 50 may be determined, as in this example, by a tubular appendage 11c of the element 11b which is arranged radially inward and axially closer to the radial channels 42 with respect to the ends 46a of the axial holes 46 facing towards the second hydraulic connection 13.

The pressure waves transmitted in the liquid through the damper 10 between the hydraulic connections 12 and 13 are forced to follow a sinuous path that has the effect of dampening these pressure waves, eliminating the drawback discussed in the introduction. The path involves the propagation of the pressure waves from the connection 13 (clutch side) through the Z-shaped passage 50 into a peripheral annular space 51. Along the passage 50, the direction of propagation of the waves is first deflected by the axial direction towards the first hydraulic connection 12 in a radially outer direction, then in the opposite axial direction (towards the second hydraulic connection 13), and therefore completes a U-turn in the axial direction towards the first hydraulic connection 12. Having crossed the axial through holes 46 in the second perforated distributor element 21, the pressure waves propagate in an annular gap 52 between the third intermediate section 17 of the cavity 14 and the first perforated distributor element 20. Then, the pressure waves are deflected radially and centrally through the second series of radial holes 24, the pressure waves arrive in the pressure chamber 30, where they cause the radial compression of the resilient vessel 31, which tightens on the central tubular element 25, expanding the pressure chamber 30 and at the same time compressing and reducing the volume of the air chamber 36 present between the resilient vessel 31 and the central element 25. Part of the air present in the air chamber it is compressed and evacuated through the central channel 26, and therefore, through the radial channels 42, the air can vent through the air vent openings 45 formed through the outer housing 11. The elastic yielding of the resilient vessel 31 absorbs a large part of the energy of the pressure waves, which are dampened and can at most reach the first hydraulic connection 12 with minimal and not perceptible intensity from the driver's foot resting on the clutch control pedal.

It will be appreciated that the arrangement that provides the resilient vessel in a substantially central position inside the damper allows to make a compressible air chamber of considerable volume, which involves a corresponding significant volumetric expansion of the hydraulic pressure chamber.

It will also be appreciated that the air vent favors the compressibility of the air chamber and allows the return of air inside the damper body, favoring the restoration of the undeformed condition of the sleeve.

The expulsion of the air allows its replacement and this always guarantees the presence of air which, if it were expelled and not allowed to re-enter, would affect the functioning of the device.

Various aspects and embodiments of a pressure wave damper have been described. It is understood that each embodiment may be combined with any other embodiment. Furthermore, without prejudice to the principle underlying the invention, embodiments and details of construction may be widely varied with respect to what has been described and illustrated purely by way of non-limiting example, without thereby departing from the scope of the invention, as defined in the appended claims.

What is claimed is:

1. A pressure wave damper in a hydraulic system for actuating a friction clutch of a motor vehicle, the pressure wave damper comprising:
    a housing having a cavity,
    a first hydraulic connection for fluidically connecting the cavity with a master cylinder of the hydraulic system,
    a second hydraulic connection for fluidically connecting the cavity with a secondary cylinder of the hydraulic system,
    a sinuous path for a fluid of the hydraulic system within the cavity between the first and second hydraulic connections, and
    a hydraulic pressure chamber, delimited at least in part by a resilient wall and located at least in part along said sinuous path, the hydraulic pressure chamber being elastically expandable by the fluid along said sinuous path;
    wherein
    the resilient wall is provided by a resilient vessel contained within the hydraulic pressure chamber,
    an air chamber is formed inside the resilient vessel, and wherein
    at least one air channel establishes an air communication between the air chamber and at least one air vent formed through the housing.

2. The pressure wave damper of claim 1, further comprising a first perforated distributor element comprising an internal cavity and a plurality of through holes, wherein the resilient vessel is contained within the internal cavity of the first perforated distributor element, and wherein the hydraulic pressure chamber is defined between the resilient vessel and the first perforated distributor element.

3. The pressure wave damper of claim 2, wherein the first perforated distributor element has a substantially tubular shape and the through holes comprise at least a first set and a second set of radial through holes, and wherein the through holes of the first set are farther from the first hydraulic connection than the through holes of the second set.

4. The pressure wave damper of claim 3, wherein the first perforated distributor element provides an annular flange that extends in a radially outer direction from an intermediate zone between the first and second sets of radial through holes and contacts a portion of a wall of the cavity of the housing.

5. The pressure wave damper of claim 1, wherein inside the resilient vessel there is received a central tubular element comprising an internal channel forming part of the at least one air channel that establishes the air communication between the air chamber and the at least one air vent.

6. The pressure wave damper of claim 5, wherein the central tubular element further comprises a plurality of axially spaced projections that protrude in radially outer directions towards the resilient wall of the resilient vessel.

7. The pressure wave damper of claim 1, further comprising a second perforated distributor element received in a portion of the cavity of the housing, wherein the second perforated distributor element
    forms at least one radial channel forming part of the at least one air channel that establishes the air communication between the air chamber and the at least one air vent, and
    comprises one or more axial through holes or openings for the fluid of the hydraulic system, not communicating with said at least one air channel.

8. The pressure wave damper of claim 7, wherein the second perforated distributor element further comprises:
    a transversely oriented central disc-shaped portion,
    a radially outer peripheral portion,
    a central opening formed in the disc-shaped portion and in fluid communication with the air chamber,
    a plurality of radial, angularly spaced air channels, each air channel communicating with the central opening and a respective peripheral opening formed in the radially outer peripheral portion, wherein the peripheral openings are in air communication with the at least one air vent, and
    two peripheral seals acting between the radially outer peripheral portion and a wall of the cavity of the housing, wherein said peripheral openings are located in axially intermediate positions between the two peripheral seals.

9. The pressure wave damper of claim 1, wherein the cavity of the housing is elongated longitudinally between the first and second hydraulic connections and has an inner wall that defines a succession of sections, and wherein two consecutive sections of the succession of sections have different diameters.

10. The pressure wave damper of claim 1, wherein the resilient vessel comprises a sleeve portion of elastomeric material, elongated in a direction parallel to a geometric axis extending between the first and second hydraulic connections.

11. The pressure wave damper of claim 1, wherein the housing defines the sinuous path, and the sinuous path comprises a plurality of deviations, each deviation changing a flow direction of the fluid as the fluid encounters the respective deviation.

* * * * *